Figure 1:
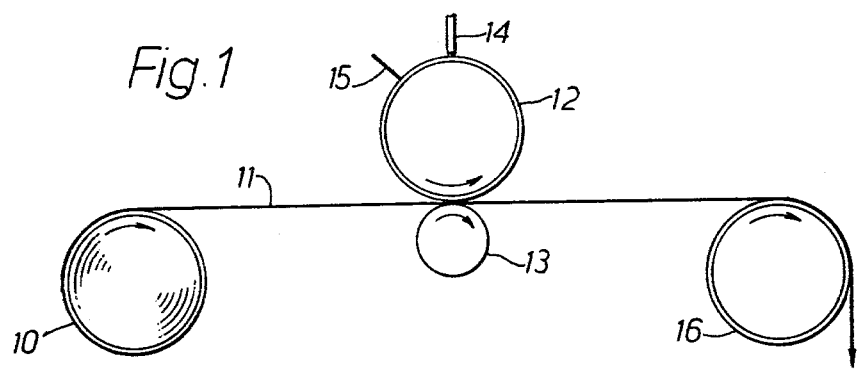

United States Patent [19]

Goslin et al.

[11] 4,286,605

[45] Sep. 1, 1981

[54] TREATING SHEET MATERIAL FOR MAKING CIGAR WRAPPERS

[75] Inventors: John K. Goslin, Beeston; John H. Bugler, Caunton; Howard Foster, Long Eaton, all of England

[73] Assignee: Imperial Group Limited, London, England

[21] Appl. No.: 55,143

[22] Filed: Jul. 6, 1979

[30] Foreign Application Priority Data

Jul. 27, 1978 [GB] United Kingdom ............... 31391/78

[51] Int. Cl.³ .......................... A24D 1/18; A24B 3/14
[52] U.S. Cl. .................................. 131/358; 131/31; 131/354
[58] Field of Search .................. 131/15 R, 15 C, 8 R, 131/17 R, 17 A, 17 AB, 31, 140; 101/129

[56] References Cited

U.S. PATENT DOCUMENTS

| | | | |
|---|---|---|---|
| 2,316,785 | 4/1943 | Gladeck | 131/31 X |
| 2,801,636 | 8/1957 | Pfoh | 131/15 C |
| 3,145,717 | 8/1964 | Osborne et al. | 131/140 |
| 3,432,328 | 3/1969 | Vaurio et al. | 101/129 X |
| 4,109,665 | 8/1978 | Godfrey et al. | 131/15 C |
| 4,135,962 | 1/1979 | Sinclair et al. | 156/387 |

FOREIGN PATENT DOCUMENTS

| | | |
|---|---|---|
| 14494 | of 1884 | United Kingdom . |
| 1021039 | 2/1966 | United Kingdom . |
| 2010751 | 7/1979 | United Kingdom . |

*Primary Examiner*—Stephen C. Pellegrino
*Attorney, Agent, or Firm*—Larson and Taylor

[57] ABSTRACT

A method of treating a web of smokable sheet material to simulate the markings of natural tobacco leaf before the web is cut to provide cigar wrapper blanks. The web is printed with a thickened ink which dries to form a ribbed pattern. Coloration of the ink may be provided by ground cigar or cigarette offal.

4 Claims, 3 Drawing Figures

U.S. Patent  Sep. 1, 1981  4,286,605

TREATING SHEET MATERIAL FOR MAKING CIGAR WRAPPERS

TECHNICAL FIELD

This invention relates to a method of providing smokeable sheet material for making cigar wrapper blanks with at least one visible pattern mark to simulate, when forming part of a cigar, the appearance of natural tobacco leaf. The invention also relates to the sheet material so marked and to a cigar having a wrapper made from the marked sheet material.

Visible pattern marks of natural tobacco leaf when used as the external wrapper which forms part of a cigar comprise lateral veins, cross-veining and a helical line formed by the overlapping turns of the tobacco leaf wrapper.

The term "cigar" is used herein in a broad sense to include not only a tobacco rod filler surrounded by a binder which in turn is surrounded by a wrapper of sheet material but also a tobacco rod filler surrounded by a wrapper of sheet material, i.e. there is no separate binder. The sheet wrapper may have a helical seam or a longitudinal seam. The tobacco rod filler may include tobacco substitute material.

BACKGROUND ART

It has already been proposed in U.S. Pat. No. 2,316,785 to emboss or impress a sheet material for making cigar binders or cigar wrappers to simulate the appearance of natural tobacco leaf by passing the material between a pair of embossing rolls. However, it has been found that embossing can rupture sheet material which is used for making the thin delicate wrapper blanks. Furthermore it may be necessary to wet the sheet material prior to stretching it and then cutting it to shape but if this is done the stretching of the wettened material tends to flatten and so destroy the embossed pattern. One object of the present invention is to avoid these disadvantages.

INVENTION

A method of treating a web of smokeable sheet material to simulate natural tobacco leaf before the web is cut to provide a series of cigar wrapper blanks wherein the web is printed with an ink in a pattern designed to simulate markings of natural tobacco leaf, the ink having a thickened composition which dries to form a ribbed pattern on the web.

Figure 2:
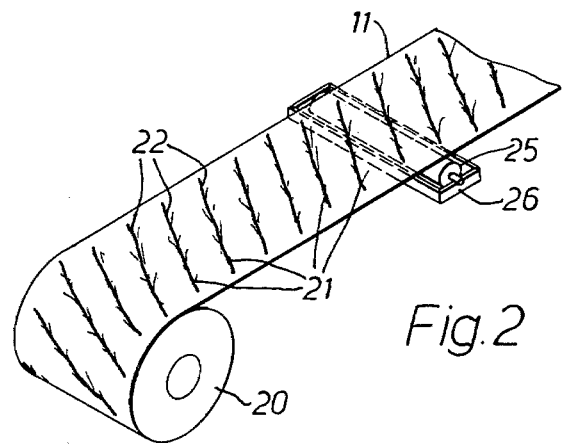
Figure 3:
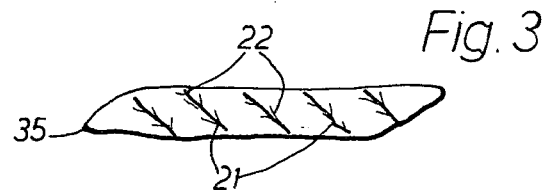

By way of example the invention will now be described with reference to the accompanying drawings of which, FIG. 1 is a diagrammatic drawing of a rotary gravure printing machine for printing pattern marks on a web of tobacco sheet material, FIG. 2 is a perspective view of the printed web being unwound from a supply reel and wetted, FIG. 3 is a plan of a printed wrapper cut from the web.

Referring to FIG. 1 a rotary gravure printing machine comprises a supply reel 10 of a web of tobacco sheet material 11, a rotatably-driven printing gravure cylinder 12, a co-operating rubber-covered impression roll 13, an ink feeder 14 for supplying ink to the printing cylinder, a docter blade 15 and an ink drying cylinder 16.

The printing cylinder 12 is engraved with a predetermined pattern of cells which receive a thickened ink supplied by the feeder 14. The pattern represents pattern marks of a natural tobacco leaf wrapper, in this example a number of inclinded substantially parallel lines having branch lines. The impression roll 13 squeezes the travelling web 11 against the cylinder 12 so that the upper surface of the web receives at the pressure nip a deposit of ink forming a pattern determined by the cell pattern of the cylinder 12. The printed web is passed around the drying cylinder 16 to dry the ink and is then wound upon a supply reel 20 (FIG. 2).

The dried visible pattern marks printed on the web 11 are shown in FIGS. 2 and 3. They consist of bold inclined lines 21 which simulate leaf lateral veins and thinner lines 22 which simulate leaf cross-veining. The lines or marks have a depth and definition which gives them the form of small ribs on the printed surface of the web, thus they form a ribbed pattern on that surface. The other surface of the web is flat and unmarked. Typically, the web has a thickness of 0.1–0.5 mm and the printed marks have a depth of 0.025–0.5 mm.

The sheet material is preferably re-constituted tobacco sheet containing tobacco offal or waste products, e.g. cut and raw stem and tobacco from rejected cigarettes. Alternatively, the sheet material may be made from a tobacco substitute material or from a mixture of tobacco waste products and a tobacco substitute material.

The ink may comprise a filler, a non-water-based solvent, an adhesive, a plasticiser and tobacco dust.

The filler which is to provide the necessary body for the ink may be calcium carbonate, a diatomaceous earth or titanium dioxide.

The solvent which acts as a carrier for the filler may be ethanol, propanol, iso-propanol, ethyl cellulose, iso-amyl acetate, benzyl acetate or benzyl alcohol. Since the solvent is a non-water-based solvent it inhibits impregnation of the sheet material by the ink and thereby promotes the formation of a suitably defined ribbed pattern.

The adhesive which binds the solids together and to the sheet material may be cellulose, cellulose acetate, dextrin starches, ethyl cellulose, methyl cellulose or molasses, or a gum such as arabic, tragacanth or acacia.

The plasticiser which prevents brittleness and cracking of the ink when dried may be triacetin, glycerol or propane- 1, 2-diol.

The tobacco dust which provides colouration of the ink the better to simulate natural leaf marks may be ground cigar offal, e.g. cigar stem, and/or ground cigarette offal, or just ordinary ground tobacco.

EXAMPLE I

A thickened ink had the following composition.

| Constituent | Amount | Description |
| --- | --- | --- |
| Benzyl Acetate | 50 ml | Liquid solvent |
| Iso-amyl Acetate | 150 ml | Liquid solvent |
| Triacetin | 4 gms | Plasticizer |
| Ethyl Cellulose | 16 gms | Adhesive |
| Calcium Carbonate | 20 gms | Filler ground to 200 mesh |
| Cigar Offal | 20 gms | Colouring ground to 200 mesh |
| Cigarette Offal | 20 gms | Colouring ground to 200 mesh |

This ink is prepared by mixing together in a high speed blender the two solvents and the liquid plasticiser and then adding the adhesive slowly to the mixture. The resultant mix is allowed to stand for up to one hour to enable the adhesive particles to swell and then the three solids are added to the mix in a high-torque slow speed mixer. The resultant thickened ink which is ready for use has a viscosity of about 8000 centipoises and a combined solvent boiling point of about 150° C.

Referring to FIG. 2 the printed dry web 11 is unwound from the reel 20 and passed over a wetting roller 25 whose lower portion dips into a water trough 26. The printed surface of the web faces upwards so that it is the non-printed surface which is directly wetted by the roller 25. Substantially the whole of the web quickly becomes impregnated by the water and as a result the web loses its brittleness and its low tensile strength and may be safely drawn through a sheet feeder unit to reach a cutting station where it is cut into a series of cigar wrapper blanks. One of such blanks is shown in FIG. 3.

An alternative printing machine to the rotary gravure printing machine is a rotary screen printing machine which has a printing cylinder forming a porous stencil. The stencil is prepared in known manner to provide print areas which correspond to the required pattern marks of a natural tobacco leaf. A thickened ink is introduced into the printing cylinder and forced out through the print areas by a squeegee blade. A travelling web of tobacco sheet material receives the ink pattern as it passes through the nip between the printing cylinder and a rubber covered impression roll.

EXAMPLE II

A thickened ink for the porous stencil had the following composition.

| Constituent | Amount | Description |
| --- | --- | --- |
| Iso-amyl Acetate | 100 ml | Liquid Solvent |
| Ethyl Acetate | 100 ml | Liquid solvent |
| Triacetin | 4 gms | Plasticizer |
| Ethyl Cellulose | 16 gms | Adhesive |
| Calcium Carbonate | 34 gms | Filler ground to 200 mesh |
| Cigar Offal | 86 gms | Colouring ground to 200 mesh |
| Cigarette Offal | 20 gms | Colouring ground to 200 mesh |

The combined solvent boiling point is about 110° C. which is sufficiently high to avoid boiling-off during the printing step but sufficiently low to facilitate quick drying of the printed ink by the drying cylinder 16.

The invention is not limited to the use of rotary printing machines. Any other method of printing the thickened ink on the smokeable sheet material may be used.

If the sheet wrapper blank is not to be applied by a helical wrapping operation to a cigar binder enclosing a filler rod but is to be applied with a longitudinal seam the web may be printed with an additional rib-like pattern mark which, in the completed cigar, simulates the helical line of overlapping turns of a conventional leaf wrapper.

The ribbed pattern produced by the dried ink resists flattening and is not removed by subsequent manufacturing steps, including wetting of the web. The tobacco dust provides a natural colouration and constituent for tobacco sheet wrappers.

We claim:

1. A method of treating a web of smokeable sheet material to simulate natural tobacco leaf before the web is cut to provide a series of cigar wrapper blanks which comprises printing the web with an ink in a pattern designed to simulate markings of natural tobacco leaf, the ink having a thickened composition which dries to form a ribbed pattern on the web, said ink comprising a filler, a non-water-based solvent, an adhesive, a plasticizer and a powder which produces a desired colouration, said powder comprising ground tobacco dust.

2. A method according to claim 1, wherein the tobacco dust comprises ground cigar offal.

3. A method of treating a web of smokeable sheet material to simulate natural tobacco leaf before the web is cut to provide a series of cigar wrapper blanks which comprises printing the web with an ink in a pattern designed to simulate markings of natural tobacco leaf, the ink having a thickened composition which dries to form a ribbed pattern on the web, said ink having the following composition:

| Constituent | Amount | Description |
| --- | --- | --- |
| Benzyl Acetate | 50 ml | Liquid solvent |
| Iso-amyl Acetate | 150 ml | Liquid solvent |
| Triacetin | 4 gms | Plasticizer |
| Ethyl Cellulose | 16 gms | Adhesive |
| Calcium Carbonate | 20 gms | Filler ground to 200 mesh |
| Cigar Offal | 20 gms | Colouring ground to 200 mesh |
| Cigarette Offal | 20 gms | Colouring ground to 200 mesh |

4. A method of treating a web of smokeable sheet material to simulate natural tobacco leaf before the web is cut to provide a series of cigar wrapper blanks which comprises printing the web with an ink in a pattern designed to simulate markings of natural tobacco leaf, the ink having a thickened composition which dries to form a ribbed pattern on the web, said ink having the following composition:

| Constituent | Amount | Description |
| --- | --- | --- |
| Iso-amyl Acetate | 100 ml | Liquid Solvent |
| Ethyl Acetate | 100 ml | Liquid solvent |
| Triacetin | 4 gms | Plasticizer |
| Ethyl Cellulose | 16 gms | Adhesive |
| Calcium Carbonate | 34 gms | Filler ground to 200 mesh |
| Cigar Offal | 86 gms | Colouring ground to 200 mesh |
| Cigarette Offal | 20 gms | Colouring ground to 200 mesh |

* * * * *